US012704894B2

(12) United States Patent
Hsu

(10) Patent No.: US 12,704,894 B2
(45) Date of Patent: Aug. 11, 2026

(54) POWER MANAGEMENT METHOD AND SYSTEM

(71) Applicant: LENOVO ENTERPRISE SOLUTIONS (SINGAPORE) PTE. LTD., Singapore (SG)

(72) Inventor: Chi-Yang Hsu, Taipei (TW)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 334 days.

(21) Appl. No.: 17/578,649

(22) Filed: Jan. 19, 2022

(65) Prior Publication Data

US 2022/0229485 A1 Jul. 21, 2022

(30) Foreign Application Priority Data

Jan. 19, 2021 (CN) ......................... 202110068891.4

(51) Int. Cl.
*G06F 1/3234* (2019.01)

(52) U.S. Cl.
CPC .................................. *G06F 1/3234* (2013.01)

(58) Field of Classification Search
CPC . G06F 1/3234; G06F 1/28; G06F 1/26; G06F 1/3287; G06F 1/3206; G06F 1/3243; Y02D 10/00
See application file for complete search history.

(56) References Cited

U.S. PATENT DOCUMENTS

| | | | | |
|---|---|---|---|---|
| 2009/0077407 | A1* | 3/2009 | Akimoto | G06F 1/26 713/340 |
| 2016/0054775 | A1* | 2/2016 | Rajappa | G06F 1/30 713/320 |
| 2017/0185129 | A1* | 6/2017 | Gara | G06F 1/3203 |
| 2018/0307288 | A1* | 10/2018 | Huang | G06F 1/3203 |
| 2020/0092118 | A1* | 3/2020 | Zhuang | H04L 12/10 |

* cited by examiner

*Primary Examiner* — Paul Yen

(57) ABSTRACT

A power management system and method including: determining a maximum power function with respect to a computing node; determining a power cap value, wherein the power cap value is the greater of the maximum power function and a minimum power consumption value of the computing node; and allocating the power cap value to the computing node, wherein the maximum power function is a product of a total power and a power ratio of the computing node.

16 Claims, 6 Drawing Sheets

Computing Node Initialization &/or Power Inventory
220

Determine Total Power Bank
224

Determine Power Parameters
226

FIG. 3

| Priority Sequence | Pmin (W) | Pmax (W) | ∑Pmax (W) | Power Ratio | Total Power (W) | †Pmax function value (W) | Power Cap Value (W) |
|---|---|---|---|---|---|---|---|
| Node D | 600 | 700 | 2200 | 0.318 | 1757 | 558.7 | 600 |
| Node A | 500 | 600 | 1500 | 0.400 | 1157 | 462.8 | 500 |
| Node C | 400 | 500 | 900 | 0.556 | 657 | 365.3 | 400 |
| Node B | 250 | 400 | 400 | 1 | 257 | 257.0 | 257 |
| Total | | | | | | | 1757 |

FIG. 5

| Powering on Computing Node | Pmin | Pmaxn | Pmaxn/ΣPMax | TP | Max (Pmin, PMaxFunction) | Power Cap |
|---|---|---|---|---|---|---|
| D | 520 | 700 | 1 | 2000 | 2000 | 2000 |
| | | | | | Sum of Power Cap | 2000 |

FIG. 6A

| Powering on Computing Node | Pmin | Pmaxn | Pmaxn/ΣPMax | TP | Max (Pmin, PMaxFunction) | Power Cap |
|---|---|---|---|---|---|---|
| D | 520 | 700 | 1/2 | 2000 | 1000 | 1000 |
| A | 510 | 700 | 1 | 1000 | 1000 | 1000 |
| | | | | | Sum of Power Cap | 2000 |

FIG. 6B

| Powering on Computing Node | Pmin | Pmaxn | Pmaxn/ΣPMax | TP | Max (Pmin, PMaxFunction) | Power Cap |
|---|---|---|---|---|---|---|
| D | 520 | 700 | 1/3 | 2000 | 700 | 700 |
| A | 510 | 700 | 1/2 | 1300 | 700 | 700 |
| C | 420 | 600 | 1 | 600 | 600 | 600 |
| | | | | | Sum of Power Cap | 2000 |

FIG. 6C

| Powering on Computing Node | Pmin | Pmaxn | Pmaxn/ΣPMax | TP | Max (Pmin, PMaxFunction) | Power Cap |
|---|---|---|---|---|---|---|
| D | 520 | 700 | 2/7 | 2000 | 560 | 560 |
| A | 510 | 700 | 2/5 | 1440 | 560 | 560 |
| C | 420 | 600 | 1/2 | 880 | 480 | 480 |
| B | 300 | 500 | 1 | 400 | 400 | 400 |
| | | | | | Sum of Power Cap | 2000 |

FIG. 6D

POWER MANAGEMENT METHOD AND SYSTEM

TECHNICAL FIELD

The present disclosure generally relates to a power management method and system for a computing system.

BACKGROUND

A server system may include different types and models of servers, especially when the servers are updated or replaced at different times. A power management method and system that can take into consideration different power requirements and changes in power requirements can help improve the efficiency and reliability of the server system.

SUMMARY

In one aspect, the present disclosure provides a power management method including: determining a maximum power function with respect to a computing node; determining a power cap value, wherein the power cap value is the greater of the maximum power function and a minimum power consumption value of the computing node, and the maximum power function is a product of a total power and a power ratio of the computing node; and allocating the power cap value to the computing node.

The power management method above, further including: determining a priority sequence for a plurality of computing nodes in a system domain; and in order of the priority sequence, allocating respective power cap values for the plurality of computing nodes. The power management method according to any of the above, wherein the priority sequence is ordered in decreasing order of the respective minimum power consumption values of the plurality of computing nodes.

The power management method according to any of the above, wherein the computing node precedes a next computing node in the priority sequence, if the maximum power consumption value of the computing node is greater than a maximum power consumption value of the next computing node, and if the minimum power consumption value of the computing node is substantially equal to a minimum power consumption value of the next computing node. The power management method according to any of the above, further including: determining the total power with respect to a next computing node after determining the power cap value for the computing node, wherein the next computing node immediately follows the selected computing node in the priority sequence.

The power management method according to any of the above, wherein the power ratio of the computing node is a ratio of a maximum power consumption value of the computing node to a sum of maximum power consumption values of pending computing nodes. The power management method according to any of the above, wherein the total power is determined with respect to the pending computing nodes collectively.

The power management method according to any of the above, further including: iteratively updating the total power and the power ratio before determining the power cap value for each computing node in the system domain. The power management method according to any of the above, wherein the total power decreases and the power ratio increases with each iterative update.

In another aspect, a power management system includes a power controller configured to: determine a maximum power function with respect to a computing node; determine a power cap value, wherein the power cap value is the greater of the maximum power function and a minimum power consumption value of the computing node, and wherein the maximum power function is a product of a total power and a power ratio of the computing node; and allocate the power cap value to the computing node.

The power management system above, wherein the power controller is further configured to: determine a priority sequence for a plurality of computing nodes in a system domain; and in order of the priority sequence, allocate respective power cap values for the plurality of computing nodes. The power management system according to any of the above, wherein the priority sequence is ordered in decreasing order of the respective minimum power consumption values of the plurality of computing nodes.

The power management system according to any of the above, wherein the computing node precedes a next computing node in the priority sequence, if the maximum power consumption value of the computing node is greater than a maximum power consumption value of the next computing node, and if the minimum power consumption value of the computing node is substantially equal to a minimum power consumption value of the next computing node. The power management system according to any of the above, wherein the power controller is configured to determine the total power with respect to a next computing node, after determining the power cap value for the computing node, and wherein the next computing node immediately follows the computing node in the priority sequence.

The power management system according to any of the above, wherein the power ratio of the computing node is a ratio of a maximum power consumption value of the computing node to a sum of maximum power consumption values of pending computing nodes. The power management system according to any of the above, wherein the total power is determined with respect to the pending computing nodes collectively.

The power management system according to any of the above, wherein the power controller is configured to iteratively update the total power and the power ratio before determining the respective power cap value for each computing node in the system domain. The power management system according to any of the above, wherein the total power decreases and the power ratio increases with each iterative update.

BRIEF DESCRIPTION OF DRAWINGS

FIG. 3 is a schematic diagram of a power inventory process of FIG. 2.

FIG. 5 shows an example of a system domain with power cap values allocated according to the method of FIG. 2.

FIGS. 6A to 6D show an example of a system domain configured according to the method of FIG. 2.

DETAILED DESCRIPTION

Figure 1:
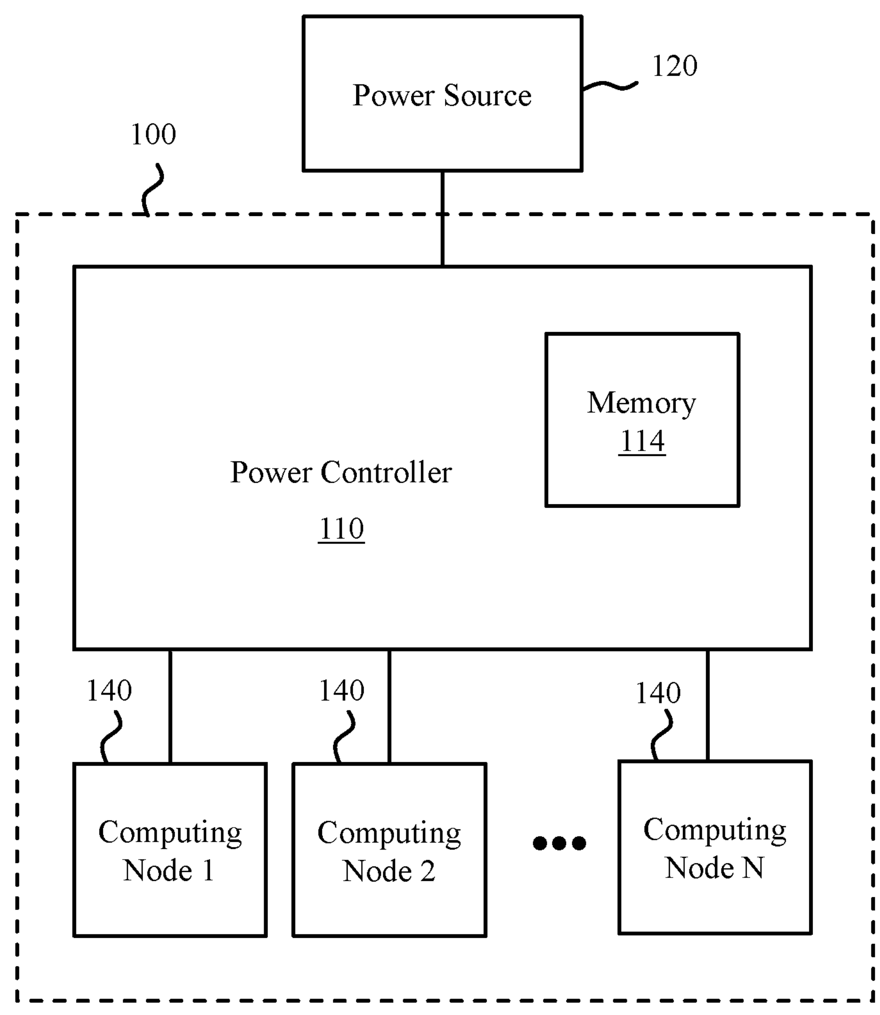
FIG. 1 is a schematic diagram of a power management system according to one embodiment of the present disclosure.

FIG. 1 shows a computing system (100). The computing system includes a plurality of computing nodes (140). The computing node, for example, may be a computing device such as a server. One example of a computing system includes one or more server racks having a plurality of servers. The computing system is configured to operate using power drawn from a power source (120). A power controller (110) is configured to manage the power distribution among the various computing nodes. In some situations, the computing system may include different types or models of computing nodes. At any one time, the various computing nodes in the same computing system may not have the same power requirements and efficiencies. In some situations, one or more computing nodes may be upgraded, replaced or added to the computing system, such that the original power management method no longer corresponds to the optimal configuration for operational performance and energy efficiency. In some situations, the computing system may be designed to avoid an overcurrent event by failing to boot up or by entering into a fault state. When such situations happen, the average user may lack the access or expertise to quickly re-configure the computing system.

According to one embodiment of the present disclosure, the power management system includes a power controller (110) configured to perform a power management method in a computing system (100) or a system domain, in which the computing system or the system domain includes a plurality of computing nodes (140). The computing nodes are configured to draw power from a power source (120). The power management system may include a memory (114) configured to store data related to the power consumption or power requirement of each of the computing nodes (140). The power management system is configured to execute a power management method (200) as described below.

Figure 2:
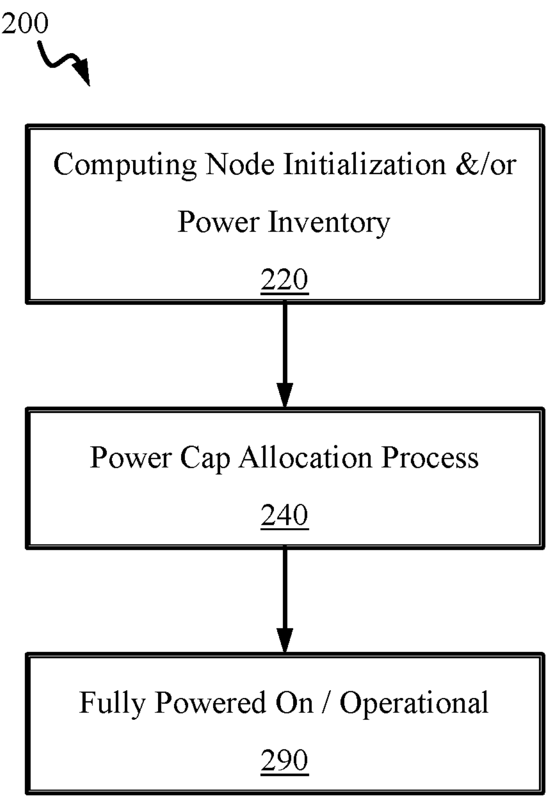
FIG. 2 is a schematic diagram of a power management method according to one embodiment.

FIG. 2 illustrates a method according to embodiments of the present disclosure. In some examples, the power controller is configured to perform a power cap allocation process in response to the one or more computing nodes in the system domain being reset or being connected to an alternating current power source. The power cap value refers to the maximum amount of power permitted to be drawn by a computing node under any load condition. In one aspect, the power controller may be configured to perform a power cap allocation process (240) in response to a node initialization and/or power inventory process (220), before the respective computing nodes are fully powered on (290). In another aspect, the power controller may be configured to perform a power inventory process (220) and/or dynamic allocation (240) of one or more power cap values, without interrupting the operation of the computing system. In yet another aspect, the power controller may be configured to perform a power cap allocation process (240) for all the computing nodes in a system domain, based on power inventory data (220), such that all the computing nodes are allocated sufficient power to be fully powered on or operational, without the need for intervention by technical experts. The computing system may be configured to perform the node initialization and/or power inventory process (220) in response to a change in the computing system. In some examples, the power controller may enable automatic or dynamic re-configuration of the power cap allocation in response to a change in the number of computing nodes in the system domain. This may include situations where one or more of the computing nodes fail. It may include situations where one or more computing nodes are added to the computing system. In some examples, the power controller may enable automatic re-configuration of the power cap allocation in response to a change in a parameter related to operational performance and/or power requirements. The power controller may be configured to determine the respective power cap values for the computing nodes in the system domain, in response to a change in the total power. For example, if one of the power supply units of the power source fails or if additional power supply is provided to the system domain, the power controller may be configured to re-configure the power cap allocation accordingly.

Figure 3:
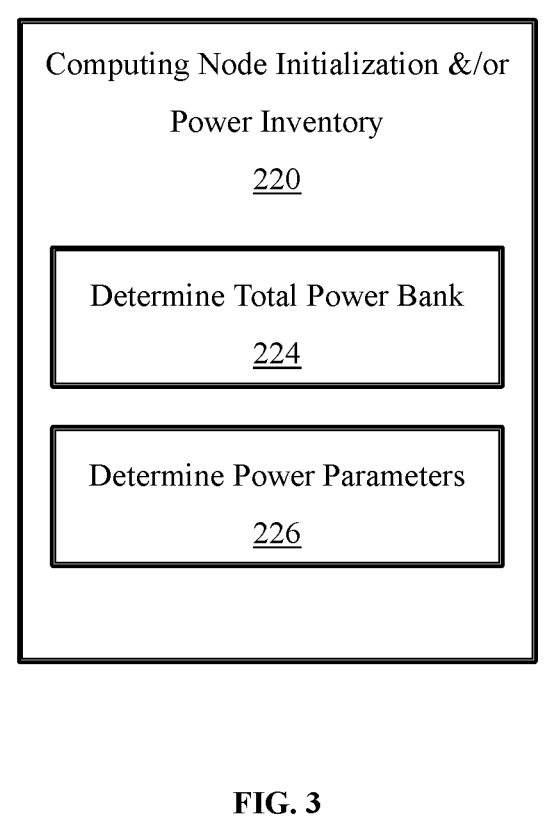

Referring to FIG. 3, as part of the power inventory process, the power controller is configured to determine the total power bank (TPB) available for use by the whole system domain. The total power bank may include the power to be shared among all the computing nodes, as well as the power required by other devices in the computing system.

The power inventory process includes determining (226) power related parameters of the computing nodes in the system domain. Each computing node may be associated with corresponding power related parameters. Examples of the power related parameters include minimum power consumption (Pmin) and maximum power consumption (Pmax). The minimum power consumption refers to the power consumption of the computing node when the computing node is operating under a fully-throttled or a minimum workload condition. The minimum power consumption value may refer to an amount of power required for the computing node to keep the computing node from shutting down. The maximum power consumption refers to a power consumption of a computing node when the computing node is under a stressed or unthrottled condition, or when the computing node is under a full workload condition.

Figure 4:
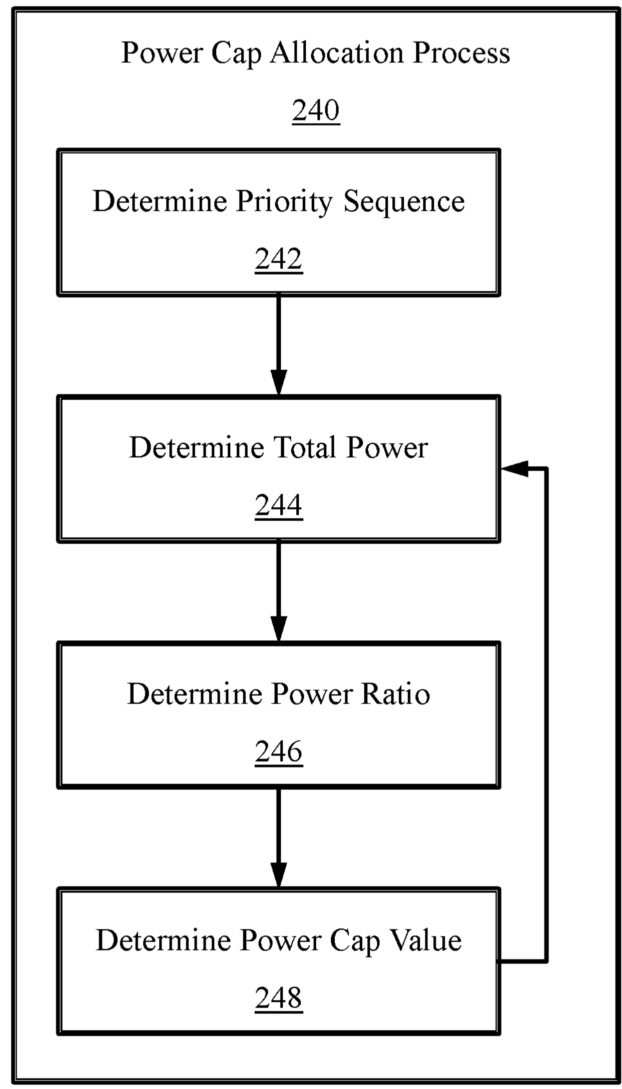
FIG. 4 is a schematic diagram of a power cap allocation process of FIG. 2

The power controller is configured to determine (242) a priority sequence, as illustrated in FIG. 4. The priority sequence refers to a sequential order according to which the computing nodes are allocated a respective power cap value, one computing node after another. In other words, the power controller is configured to determine the power cap value for each computing node according to the priority sequence. The priority sequence may be based on a decreasing order of the minimum power consumption of the plurality of computing nodes in the system domain. The power controller may be configured to determine the power cap value for each computing node in turn, beginning with the computing node with the highest minimum power consumption in the system domain. The last computing node to be allocated the power cap value will be the computing node having the lowest minimum power consumption among the computing nodes in the system domain. If two computing nodes have the same minimum power consumption, priority will be given to the computing node having the higher maximum power consumption.

The power controller may also be configured to determine the total power (TP) available (244). The total power available to all computing nodes may be a substantial percentage of the power bank. The power controller may be configured to execute the power inventory process if the total power bank changes. According to embodiments of the present disclosure, the total power may be dynamically updated. For the sake of brevity, in the present disclosure, a computing node which has been allocated a power cap value is referred to as an allocated computing node, and a computing node pending allocation of a power cap value is referred to as a pending computing node. A situation in which a new computing node is added to two existing computing nodes is now described as an example. At the beginning of a power cap allocation sequence, all three computing nodes are pending computing nodes. The power controller is configured to determine and allocate a power cap value PC1 to the first computing node, in which the power cap value PC1 is based on a total power TP1. At the next step, the first computing node is deemed an allocated computing node, while the second computing node and the third computing node are deemed pending computing nodes. The power cap value PC2 for the second computing node is now determined based on a corresponding total power TP2 available to the pending computing nodes. Similarly, the power cap value PC3 that is allocated to the remaining pending computing node is based on a total power TP3 available at this step. It can thus be understood that the power controller is configured to determine the respective power cap values in response to a dynamically changing total power throughout the process of allocating power cap values to a plurality of computing nodes in the same system domain. The power management method includes dynamically determining the total power. In other words, the power management method includes determining the total power available to the pending computing nodes at each iteration of the power cap allocation process, in which each iteration allocates a power cap value to one of a plurality of computing nodes in the system domain.

The power management method includes determining (246) a power ratio with respect to one of a plurality of computing nodes in the system domain. In some embodiments, the power ratio corresponding to a computing node is a ratio of the maximum power consumption value (Pmax) of the computing node to the sum of the maximum power values of the pending computing nodes in the system domain (ΣPmax). For example, in a system domain having four computing nodes, relative to the third computing node in the priority sequence, ΣPmax is a sum of the maximum power value of the third computing node and the maximum power value of the fourth computing node in the priority sequence. The power ratio may be represented as (Pmax/ΣPmax). It can be appreciated that determination of the total power and the power ratio may be performed in any order relative to each other, not necessarily in the sequence as shown in FIG. 4, for example, the total power and the power ratio may be determined substantially concurrently.

The power management method further includes determining a power cap value (PPCn) of a computing node in the system domain, in which the power cap value is a greater of the minimum power consumption value (Pmin) of the computing node and a maximum power function. The maximum power function (Pmax function) is a product of the total power (TP) of the pending computing nodes and the power ratio (Pmax/ΣPmax) of the computing node, as expressed in Equation 1 below:

$$PPCn = \text{Max}\left(P\text{min}, \left(TP * \frac{P\text{max}}{\sum P\text{max}}\right)\right) \quad \text{Equation 1}$$

After allocating a power cap value to a computing node, the power controller is configured to iterate a power cap allocation process with respect to the next computing node in the priority sequence. The total power and the sum of the maximum power consumption value are updated with respect to the pending computing nodes at this iteration. The power cap allocation process may be configured to continue to iterate until all computing nodes in the system domain have been allocated respective power cap values.

Examples of the power management method and system will be further described with reference to a few examples to aid understanding. FIG. 5 illustrates a computing system with four computing nodes with respective power parameters. The total power (TP) to be allocated to the four computing nodes in this example is 1757 Watts (W). Computing node A has a Pmin of 500 W and a Pmax of 600 W. Computing node B has a Pmin of 250 W and a Pmax of 400 W. Computing node C has a Pmin of 400 W and a Pmax of 500 W. Computing node D has a Pmin of 600 W and a Pmax of 700 W. The power controller is configured to perform an allocation of the power cap values according to a priority based on a decreasing order of the respective Pmin values. Thus, the power cap allocation is performed according to the following priority sequence: computing node D, followed by a next computing node A, then followed by computing node C, and followed by computing node B.

The power cap value is determined for each computing node according to the priority sequence. For example, the power cap value for the pending computing node A is taken to be the greater of a first value and a second value. The first value in this example is Pmin of computing node A, that is, Pmin=500 W. The total power (TP) at this stage is the total power bank (TPB) less the power cap value already allocated to the allocated computing node D (which precedes the computing node A in the priority sequence). Thus, the total power value corresponding to the computing node A is 1757 W−600 W=1157 W. The power ratio corresponding to the computing node A may be expressed as: (Pmax/ΣPmax). Pmax refers to the maximum power consumption of the pending computing node A, that is, 600 W. ΣPmax at this time refers to the sum of the maximum power consumption of all the pending computing nodes (pending allocation of the power cap values). Thus, ΣPmax for the purpose of determining the power cap value of the computing node A=600 W+500 W+400 W=1500 W. The power ratio for the purpose of determining the power cap value of computing node A is thus approximately 0.400. The second value may be referred to as a product of a power ratio and the total power ((Pmax/ΣPmax)*TP). In this example, the maximum power function value is 0.400 of 1157 W, which is approximately 462.8 W. The power cap value is the greater of the first value 500 W and the second value 462.8 W. Thus, the power cap value allocated to the computing node A is 500 W.

Moving down the priority sequence to determine the power cap value for the next computing node C, the total power is dynamically updated by subtracting the power cap value allocated to the computing node A. The total power with respect to the next computing node C is therefore 1157 W−500 W=657 W. The power ratio is also dynamically updated with respect to the remaining pending computing nodes C and B. That is, now that computing node A has been allocated a power cap value, the sum of the maximum power consumption values will not include the contribution of the maximum power consumption of computing node A. The power ratio corresponding to the next computing node C is this about 0.556, and the corresponding maximum power function value=0.556*657=365.3 W. The power controller is configured to compare the minimum power consumption value (400 W) with the maximum power function value (365.3 W), and to select the greater value of the two to use as the power cap value for the computing node C. The computing node C is thus allocated the power cap value of 400 W.

FIG. 6A to FIG. 6D illustrate how a computing system, such as a server system, may be configured so that it can adapt its power management configuration to suit the number of operating computing nodes. FIG. 6A illustrates a situation where only one computing node is to be powered on. This may be detected upon initialization of the computing node and on executing a power inventory process. Since only one computing node is to be powered on, the power ratio is 1 and the total power of 2000 W may be allocated to the computing node.

FIG. 6B illustrates the same computing system, but upon executing the power inventory process, the power controller determines that two computing nodes are to become operational, namely, computing node D and computing node A. The power controller determines a priority sequence in which computing node D is to be allocated a power cap value before computing node A. This is on the basis that the computing node D has a higher minimum power consumption than the computing node A. The power controller is configured to iteratively update the total power and the power ratio before determining the power cap value for each computing node in the system domain. The updated total power and the updated power ratio is thus used to determine the power cap value for the computing node A. That is, in each iteration (which also corresponds to each computing node in the priority queue), the power cap value is determined for a computing node. The power controller is configured such that the total power decreases and the power ratio increases with each iterative update. As shown, the sum of all allocated power cap values is no greater than the original total power (before any allocation) available to all the computing nodes collectively.

FIG. 6C illustrates the same computing system, in which another computing node C is going to be operational. Referring to FIG. 6C, at the step in the priority sequence when the power controller is determining the power cap value for the computing node A, the total power at the time is 1300 W and not 1000 W as shown in FIG. 6B. This is because the original total power of 2000 W has been reduced by the power cap value allocated to computing node D (700 W). The total power is similarly and dynamically updated when the computing node B is going to be operational. As illustrated, the power controller is configured to take into consideration the computing nodes lower in the priority queue even at a time of allocating the respective power cap values to computing nodes higher in the priority queue. The priority queue is not dependent on which computing node is first coupled to the computing system, but on respective power related parameters of all the computing nodes. In this manner, even the computing node that is last introduced into the system domain can be allocated a power cap value sufficient for the last introduced computing node to be operational.

FIG. 6D illustrates the same computing system, in which yet another computing node B is to become operational. Using a method according to an embodiment of the present disclosure, the power cap values can be assigned so that each computing node is allocated a power cap value that is sufficient for each computing node to be operational, regardless of its position in the order of powering-on, and regardless of when the computing node is added to the computing system. It can also be appreciated that, using the power management method disclosed herein, the total power requirement of all the computing nodes does not exceed the total power available to the system domain. At the same time, the power ratio is also dynamically updated so that the power ratio increases.

As used herein, the singular “a” and “an” may be construed as including the plural “one or more” unless clearly indicated otherwise.

This disclosure has been presented for purposes of illustration and description but is not intended to be exhaustive or limiting. Many modifications and variations will be apparent to those of ordinary skill in the art. The example embodiments have been chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting, and that various other changes and modifications may be effected therein by one of ordinary skill in the art without departing from the scope of the disclosure.

The invention claimed is:

1. A power management method comprising:

calculating, based on a maximum power function, a maximum power function value with respect to a computing node, wherein the maximum power function value is a product of a total power available and a power ratio of the computing node, wherein the power ratio of the computing node is a ratio of a maximum power consumption value of the computing node to a sum of maximum power consumption values of pending computing nodes;

determining a power cap value, wherein the power cap value is the greater of the maximum power function value for the computing node and a minimum power consumption value of the computing node; and allocating the power cap value to the computing node, wherein allocating the power cap value enables the computing node to operate without exceeding the total power available.

2. The power management method of claim 1, further comprising:

determining a priority sequence for a plurality of computing nodes in a system domain; and in order of the priority sequence, allocating respective power cap values for the plurality of computing nodes.

3. The power management method of claim 2, wherein the priority sequence is ordered in decreasing order of the respective minimum power consumption values of the plurality of computing nodes.

4. The power management method of claim 3, wherein the computing node precedes a next computing node in the priority sequence, if the maximum power consumption value of the computing node is greater than a maximum power consumption value of the next computing node, and if the minimum power consumption value of the computing node is equal to a minimum power consumption value of the next computing node.

5. The power management method of claim 3, further comprising:

determining the total power available with respect to a next computing node after determining the power cap value for the computing node, wherein the next computing node immediately follows the computing node in the priority sequence.

6. The power management method of claim 1, wherein the total power available is determined with respect to the pending computing nodes collectively.

7. The power management method of claim 2, further comprising:

iteratively updating the total power available and the power ratio before determining the power cap value for each computing node in the system domain.

8. The power management method of claim 7, wherein the total power available decreases and the power ratio increases with each iterative update.

9. A power management system comprising:

a power controller configured to:

determine, based on a maximum power function, a maximum power function value with respect to a computing node, wherein the maximum power function value is a product of a total power available and a power ratio of the computing node, wherein the power ratio of the computing node is a ratio of a maximum power consumption value of the computing node to a sum of maximum power consumption values of pending computing nodes;

determine a power cap value, wherein the power cap value is the greater of the maximum power function value for the computing node and a minimum power consumption value of the computing node; and allocate the power cap value to the computing node, wherein allocating the power cap value enables the computing node to operate without exceeding the total power available.

10. The power management system of claim 9, wherein the power controller is further configured to:

determine a priority sequence for a plurality of computing nodes in a system domain; and in order of the priority sequence, allocate respective power cap values for the plurality of computing nodes.

11. The power management system of claim 10, wherein the priority sequence is ordered in decreasing order of the respective minimum power consumption values of the plurality of computing nodes.

12. The power management system of claim 11, wherein the computing node precedes a next computing node in the priority sequence, if the maximum power consumption value of the computing node is greater than a maximum power consumption value of the next computing node, and if the minimum power consumption value of the computing node is equal to a minimum power consumption value of the next computing node.

13. The power management system of claim 11, wherein the power controller is configured to determine the total power available with respect to a next computing node, after determining the power cap value for the computing node, and wherein the next computing node immediately follows the computing node in the priority sequence.

14. The power management system of claim 9, wherein the total power available is determined with respect to the pending computing nodes collectively.

15. The power management system of claim 10, wherein the power controller is further configured to iteratively update the total power available and the power ratio before determining the power cap value for each computing node in the system domain.

16. The power management system of claim 15, wherein the total power available decreases and the power ratio increases with each iterative update.

* * * * *